US012241614B2

(12) United States Patent
Yang et al.

(10) Patent No.: US 12,241,614 B2
(45) Date of Patent: Mar. 4, 2025

(54) LIGHTING FIXTURE ADAPTER

(71) Applicant: Eaton Intelligent Power Limited, Dublin (IE)

(72) Inventors: Yang Yang, Shanghai (CN); Peihuan Liu, Shanghai (CN); Yuru Li, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/630,220

(22) Filed: Apr. 9, 2024

(65) Prior Publication Data

US 2024/0337368 A1 Oct. 10, 2024

(30) Foreign Application Priority Data

Apr. 10, 2023 (CN) ......................... 202320777828.2

(51) Int. Cl.
*F21V 21/02* (2006.01)
*F21V 21/14* (2006.01)

(52) U.S. Cl.
CPC ............ *F21V 21/025* (2013.01); *F21V 21/14* (2013.01)

(58) Field of Classification Search
CPC ............................... F21V 21/025; F21V 21/14
USPC ............................................ 362/217.01, 217
See application file for complete search history.

(56) References Cited

U.S. PATENT DOCUMENTS

| | | | | |
|---|---|---|---|---|
| 5,653,412 A * | 8/1997 | Martorano | .............. | F21V 21/34 362/418 |
| 2015/0184841 A1 | 7/2015 | Liu | | |
| 2015/0292719 A1* | 10/2015 | Park | ........................ | F21S 8/026 362/217.05 |

FOREIGN PATENT DOCUMENTS

| | | | | |
|---|---|---|---|---|
| CN | 109237357 A | 1/2019 | | |
| CN | 213479956 U | 6/2021 | | |
| KR | 102273174 B1 | 7/2021 | | |
| KR | 102435594 B1 | 8/2022 | | |
| WO | WO 2006047626 A2 | 5/2006 | | |
| WO | WO-2013021042 A1 * | 2/2013 | ................ | F21S 4/28 |
| WO | WO 2022228206 A1 | 11/2022 | | |

OTHER PUBLICATIONS

Machine translation WO-2013021042-A1 (Feb. 14, 2013) (Year: 2013).*

* cited by examiner

*Primary Examiner* — Laura K Tso
(74) *Attorney, Agent, or Firm* — Baker Botts L.L.P.

(57) ABSTRACT

In one embodiment, a lighting fixture adapter includes a sliding rail structure configured to slidably receive an insert and a mounting slot positioned below the sliding rail structure and configured with one or more mounting holes at a bottom of the mounting slot. The insert may be configured to be secured to a mounting position. The one or more mounting holes may be configured to receive one or more mounting features to secure a lighting device to the lighting fixture adapter. A position of the insert in the sliding rail structure is adjustable within a length range of the sliding rail structure.

10 Claims, 4 Drawing Sheets

LIGHTING FIXTURE ADAPTER

PRIORITY

This application claims the benefit under 35 U.S.C. § 119(a) of Chinese Utility Model Patent Application No. 20/2320777828.2, filed 10 Apr. 2023, which is incorporated herein by reference.

TECHNICAL FIELD

The present disclosure relates to a lighting device, and in particular to a lighting fixture adaptor for flexible mounting.

BACKGROUND

Mounting devices for mounting lighting devices are generally known. Although the existing lighting mounting devices can achieve fixation and connection of the lighting devices to mounting structures at sites, the lighting mounting devices are generally limited to fixed mounting distances in different degrees. Therefore, when replacement of the lighting devices is required, the existing mounting structures need to be re-perforated or modified in other ways. In addition, the existing lighting mounting devices generally require one-to-one matching with the lightings, so that the replacement of the lightings of different specifications may not be simply achieved.

Therefore, there is a need for a lighting fixture adapter that allows for flexible mounting and replacement, which may advantageously meet mounting requirements and lighting requirements at different sites.

SUMMARY OF PARTICULAR EMBODIMENTS

The present disclosure provides a lighting fixture adapter. The lighting fixture adapter includes a sliding rail structure configured to slidably receive an insert and a mounting slot positioned below the sliding rail structure and configured with one or more mounting holes at a bottom of the mounting slot. The insert is configured to be secured to a mounting position. The one or more mounting holes are configured to receive one or more mounting features to secure a lighting device to the lighting fixture adapter. A position of the insert in the sliding rail structure is adjustable within a length range of the sliding rail structure.

In particular embodiments, when the mounting features are secured to the mounting slot, the mounting features are positioned below the sliding rail structure and allows the insert to slide in the sliding rail structure.

In particular embodiments, the sliding rail structure has two open ends configured to allow for insertion of the insert into the sliding rail structure in a transverse direction.

In particular embodiments, the lighting fixture adapter further includes a spacer plate structure configured between the sliding rail structure and the mounting slot.

In particular embodiments, the spacer plate structure has one or more through holes, and positions of the through holes correspond to positions of the mounting holes of the mounting slot in a vertical direction to allow the mounting features to pass through along the vertical direction.

In particular embodiments, the sliding rail structure, the mounting slot, and the spacer plate structure are integrally formed.

In particular embodiments, the lighting fixture adapter is configured with a cross-sectional shape similar to two stacked trapezoids.

In particular embodiments, the insert is a bolt.

In particular embodiments, the mounting feature is a screw.

In particular embodiments, a length of the lighting fixture adapter is adjustable to fit to different lighting devices.

BRIEF DESCRIPTION OF THE DRAWINGS

The present disclosure will be described in more detail hereinafter with reference to exemplary embodiments by means of the accompanying drawings, in which.

DESCRIPTION OF EXAMPLE EMBODIMENTS

Reference will now be made in detail to examples illustrated in the accompanying drawings. Wherever possible, the same reference numbers will be used for referring to the same or similar parts throughout the drawings. Directional references such as "upper", "lower", "left", and "right" are provided for ease of reference to the accompanying drawings, and are not intended to limit the scope of the present disclosure.

Figure 1:
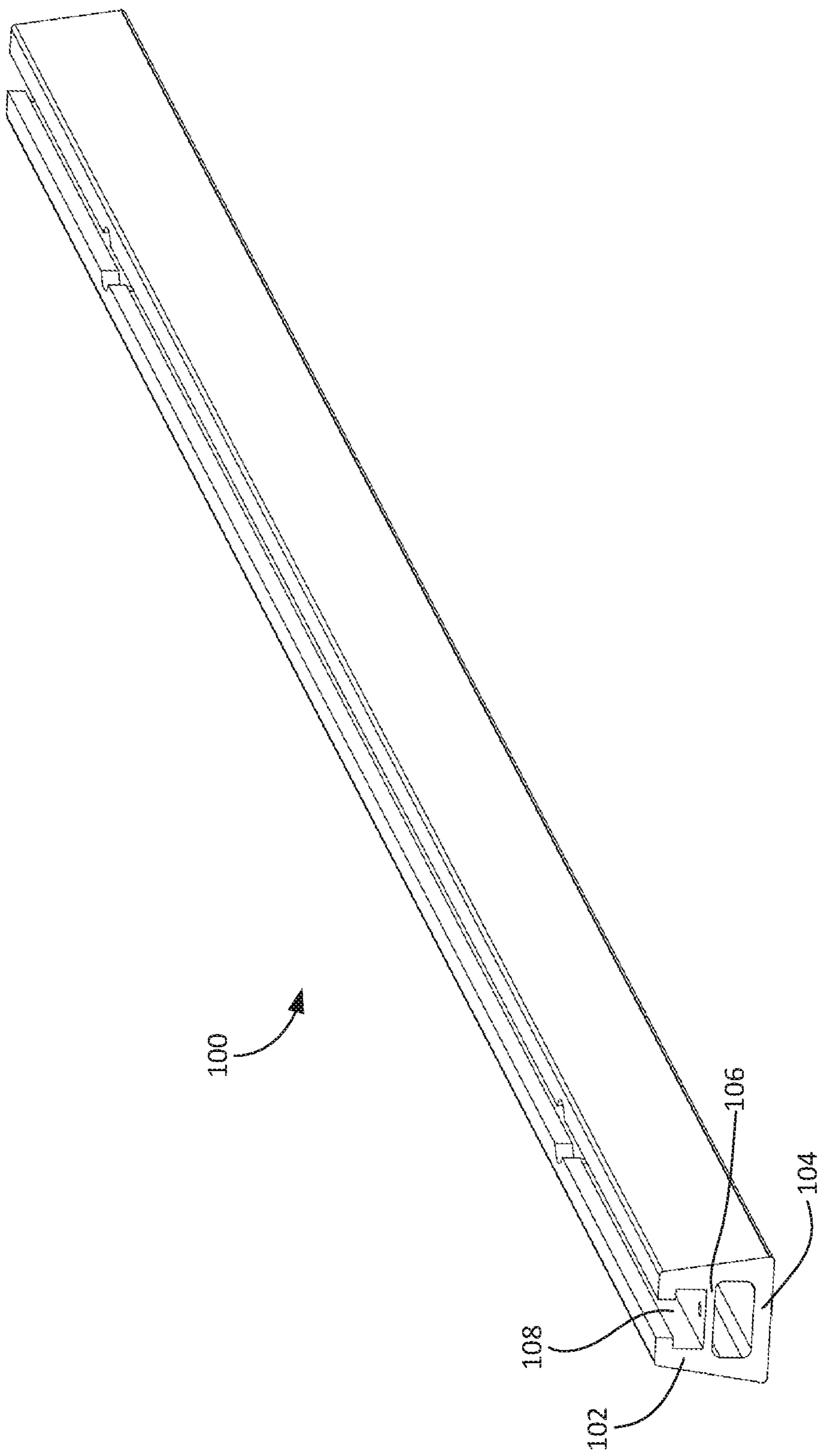
FIG. 1 shows an isometric view of an exemplary embodiment of a lighting fixture adapter according to the present disclosure.

FIG. 1 shows an exemplary embodiment of a lighting fixture adapter 100 according to the present disclosure. In some embodiments, the lighting fixture adapter 100 may be configured to be mounted to a ceiling or a wall surface at a mounting site, and may also be configured to be mounted to a lighting pole or other desired mounting positions. The lighting fixture adapter 100 according to the present disclosure can meet mounting requirements and lighting requirements at different sites, without substantive modification or re-perforation. For example, the lighting fixture adapter 100 may provide a flexibly adjustable mounting distance, thereby being widely applicable to various existing mounting distances and mounting positions at sites. In addition, the lighting fixture adapter 100 may also meet different lighting requirements, for example, lighting devices of different specifications or lighting devices manufactured by different manufacturers, without requiring one-to-one matching between existing mounting structures at sites and the lighting devices to be mounted. Therefore, the lighting fixture adapter 100 according to the present disclosure may achieve flexible mounting of the lighting devices, thereby facilitating replacement of the lighting devices, and having wide versatility, so that time and cost for mounting and replacement of the lighting devices may be significantly saved, and a greater convenience may be provided to a user.

In the embodiment shown in FIG. 1, the lighting fixture adapter 100 is configured to be generally elongated, so as to be adapted to be mounted at a top of an elongated lighting device (not shown in FIG. 1). However, depending on a length or a structure of the lighting device to be mounted, it is also contemplated that the lighting fixture adapter may be configured with other suitable dimensions or shapes adapted to match with the lighting device. For example, a length dimension of the lighting fixture adapter 100 may be cut to fit to different lighting devices, so as to achieve higher flexibility. As further shown, an outer profile of the lighting fixture adapter 100 may be substantially trapezoidal, wherein its two sides may be inclined inwards at an angle relative to a bottom to achieve stable and firm mounting of the lighting fixture adapter to the lighting device. Of course, other configurations are possible. For example, the lighting fixture adapter may also have vertical sides. As shown in FIG. 1, the lighting fixture adapter 100 is provided with a sliding rail structure 102 and a mounting slot 104 positioned below the sliding rail structure 102. In some embodiments, the sliding rail structure 102 may be formed with an elongated groove 108 which is shown to extend along an entire length of the sliding rail structure 102 or the lighting fixture adapter 100. For example, the elongated groove 108 may be adapted to slidably receive an insert, such that a position of the insert may be conveniently adjusted over the entire length of the sliding rail structure 102 to correspond to different mounting distances, as will be described in more detail below. In the exemplary embodiment shown in FIG. 1, the mounting slot 104 may be provided below the sliding rail structure 102, and the mounting slot 104 similarly extends over an entire length of the lighting fixture adapter 100 for securing the lighting fixture adapter 100 to the lighting device. In particular, the mounting slot 104 may have, for example, one or more mounting holes (not visible in this view) at a bottom thereof for engaging one or more mounting features, so as to secure the lighting device to a bottom of the lighting fixture adapter 100, as will be explained in detail below. Further, as shown in FIG. 1, the sliding rail structure 102 and the mounting slot 104 may be configured to be double-layered structures. Specifically, a spacer plate 106 may be formed between the sliding rail structure 102 and the mounting slot 104 for spacing respective internal volumes of the sliding rail structure 102 and the mounting slot 104. In some embodiments, the sliding rail structure 102, the mounting slot 104, and the spacer plate 106 may be formed as an integrated structure or may be separately formed as desired. By way of a non-limiting example, the sliding rail structure 102, the mounting slot 104, and the spacer plate 106 may be formed by extrusion and have a structure resembling a shape of two stacked trapezoids in a cross-section, as shown in FIG. 1.

Figure 2:
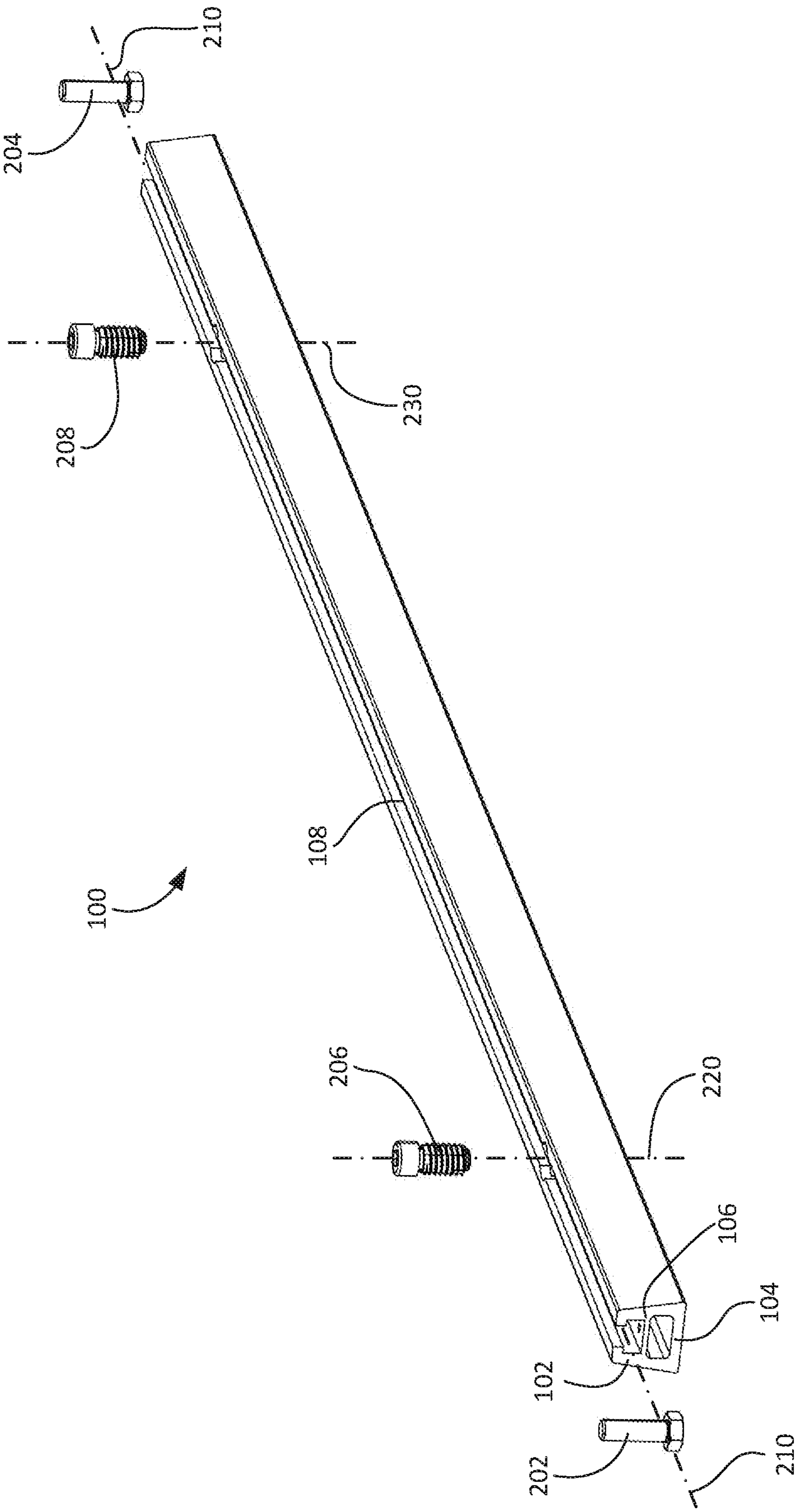
FIG. 2 shows a schematic view of mounting of the lighting fixture adapter of FIG. 1, specifically depicting insertion mounting of a plurality of exemplary bolts and screws.

Referring to FIG. 2, a mounting process of the lighting fixture adapter 100 of FIG. 1 is schematically depicted in FIG. 2. In FIG. 2, the insert which may be received in the sliding rail structure 102 is shown as two bolts 202, 204. However, it should be understood that the present disclosure is not limited to this configuration. For example, other numbers of inserts or other configurations of inserts may also be used for achieving desired functions of the present disclosure. During the mounting process, the bolts 202 and 204 may be slidably inserted into the elongated groove 108 of the sliding rail structure 102 along a transverse axis 210 from two open ends of the sliding rail structure 102, respectively. Optionally, the bolts 202 and 204 may also be mounted into the sliding rail structure 102 in other ways (for example, in a vertical direction), as will be understood by those skilled in the art. Preferably, positions of the bolts 202 and 204 in the sliding rail structure 102 are conveniently adjustable. For example, the bolts 202 and 204 may slide along the transverse axis 210 to any desired positions within a length range of the sliding rail structure 102 to correspond to mounting positions at site (for example, positions of existing mounting holes or mounting brackets at site), so as to facilitate flexible mounting. Specifically, as shown in FIG. 2, during mounting, the bolts 202 and 204 may be oriented to face upwardly, such that when the bolts 202 and 204 are inserted into the elongate groove 108 of the sliding rail structure 102 along the transverse axis 210, respective heads of the bolts 202 and 204 may be accommodated in the internal volume of the sliding rail structure 102 and stems thereof may protrude upwards in a longitudinal direction beyond an elongate opening in a top of the sliding rail structure 102 for further engagement into corresponding mounting holes at site (not shown). In some optional application examples, the bolts 202 and 204 may be fixed to mounting brackets at different angles or other suitable mounting devices according to different mounting methods. For example, the bolts 202 and 204 may be used for being fixed to a ceiling steel rail at site, or angularly mounted to a vertical wall surface, or may also be adapted to be mounted to a lighting pole and other existing mounting positions.

In the exemplary embodiment of FIG. 2, a mounting feature is also shown. In this embodiment, the mounting feature may be two screws 206 and 208. Again, it should be understood that although so shown and depicted, the present disclosure is not limited to such configurations. For example, other numbers or other structures of the mounting feature may also be contemplated to achieve the functions described herein. In the embodiment shown in FIG. 2, in order to mount and secure the lighting fixture adapter 100 to a lighting device (for example, to a top of the lighting device not shown in FIG. 2), the screws 206 and 208 may be inserted into the elongated opening in the top of the sliding rail structure 102 along vertical axes 220 and 230, respectively, further pass through the spacer plate 106, and then at least partially extend through mounting holes (not visible in this view) formed in a bottom of the mounting slot 104, so that the screws 206 and 208 may be finally screwed and fastened to the lighting device positioned below the lighting fixture adapter 100 (for example, corresponding screw holes may be formed in the top of the lighting device for receiving the screws 206 and 208). To this end, the sliding rail structure 102 (particularly the elongate opening in the top of the sliding rail structure 102) as well as the spacer plate 106 may be provided with corresponding matching or receiving structures, as described below with reference to FIG. 3 and FIG. 4. As will be understood by those skilled in the art, nuts, washers and other suitable assembling parts may also be provided to facilitate the mounting and fixing operation and will not be described in detail herein.

Figure 4:
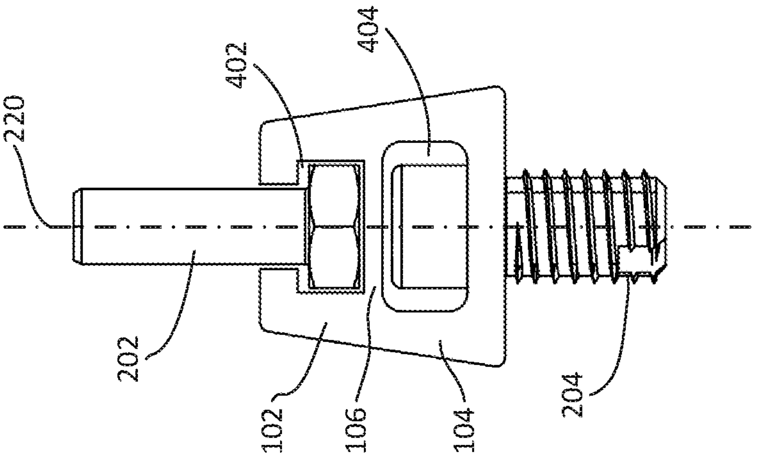
FIG. 4 shows a cross-sectional view of the lighting fixture adapter of FIG. 1 in a mounted state, which is taken along the axis 220 of FIG. 2.
Figure 3:
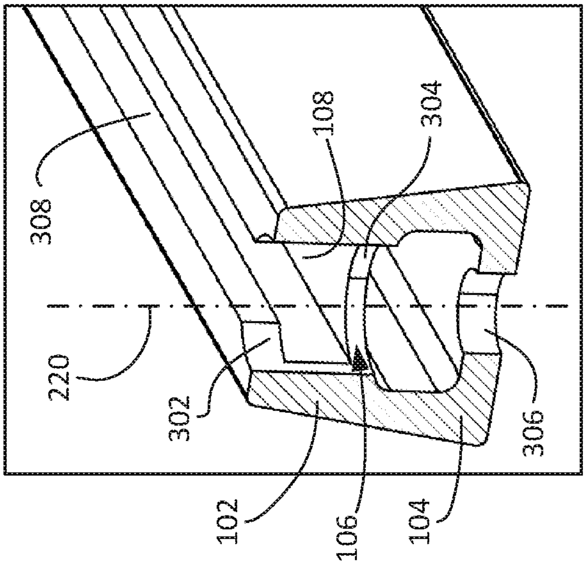
FIG. 3 shows a cross-sectional view of the lighting fixture adapter of FIG. 1, which is taken along axis 220 of FIG. 2.

Reference will now be made to FIG. 3 and FIG. 4 for description, wherein FIG. 3 shows a cross-sectional view of the lighting fixture adapter 100 which is taken along a vertical axis 220 in FIG. 2, and FIG. 4 shows a cross-sectional view in the case that the bolt 202 and the screw 206 are mounted in place to the lighting fixture adapter 100. Although the lighting fixture adapter 100 according to the present disclosure may have a plurality of same or similar such configurations within a length range thereof, for convenience of explanation and description, description will be made by only referring to one of them below.

As shown in the embodiment of FIG. 3, a notch 302 may be provided at an appropriate position on an inside edge of the elongated opening 308 in the top of the sliding rail structure 102. For example, the notch 302 may be arc-shaped to match with an outer contour of the screw 206, so as to be adapted for the screw 206 to be inserted into and pass through the notch 302 downwards in a direction of the vertical axis 220 and further enter an internal structure of the lighting fixture adapter 100. Accordingly, a through hole 304 may be formed in a corresponding position of the spacer plate 106 also for the screw 206 to be inserted into and pass through the through hole 304 downwards in a direction of the vertical axis 220 and further enter the mounting hole 306 in the bottom of the mounting slot 104. To this end, the notch 302, the through hole 304, and the mounting hole 306 may be arranged coaxially with the vertical axis 220. In addition, an inner diameter of the notch 302 and the through hole 304 may be slightly greater than or equal to an outer diameter of the head of the screw 206, and an inner diameter of the mounting hole 306 may be slightly greater than or equal to an outer diameter of a threaded stem of the screw 206, so that when fixed in place, the head of the screw 206 may be completely accommodated in an internal space of the mounting slot 104, and the threaded stem of the screw 206 may protrude through the mounting hole 306. Advantageously, the lighting fixture adapter 100 configured in such way facilitates mounting and fastening of the screw 206 along the vertical axis 220, so that the screw 206 is finally screwed into a matched screw hole of the lighting device positioned below the lighting fixture adapter 100 to facilitate firm connection between the lighting fixture adapter 100 and the lighting device.

FIG. 4 shows the lighting fixture adapter 100 with the bolt 202 and the screw 206 mounted in place, wherein the screw 206 may be inserted into the mounting slot 104 of the lighting fixture adapter 100 along the vertical axis 220, while the bolt 202 may be inserted into the sliding rail structure 102 in a direction perpendicular to the page. In this cross-sectional view, it can be clearly seen that the sliding rail structure 102 may define the internal space 402, and the mounting slot 104 may also similarly define the internal space 404, wherein the internal space 404 is positioned below the internal space 402 and separated from the internal space 402 by the spacer plate 106. In this way, the sliding rail structure 102, the spacer plate 106, and the mounting slot 104 may collectively form a double-layered structure substantially in a shape of two stacked trapezoids. In operation, after being mounted in place, the head of the bolt 202 may be completely accommodated in the internal space 402 of the sliding rail structure 102 and may freely slide therein (for example, in the direction perpendicular to the page) so as to be adjusted to correspond to a desired mounting position and mounting distance at site. Meanwhile, after being mounted in place, the head of the screw 206 may be completely accommodated in the internal space 404 of the mounting slot 104 and separated from a sliding adjustment track of the bolt 202 by means of the spacer plate 106, such that when the position of the bolt 202 needs to be adjusted, the screw 206 will not obstruct free movement of the bolt 202 in the sliding rail structure 102.

Figure 5:
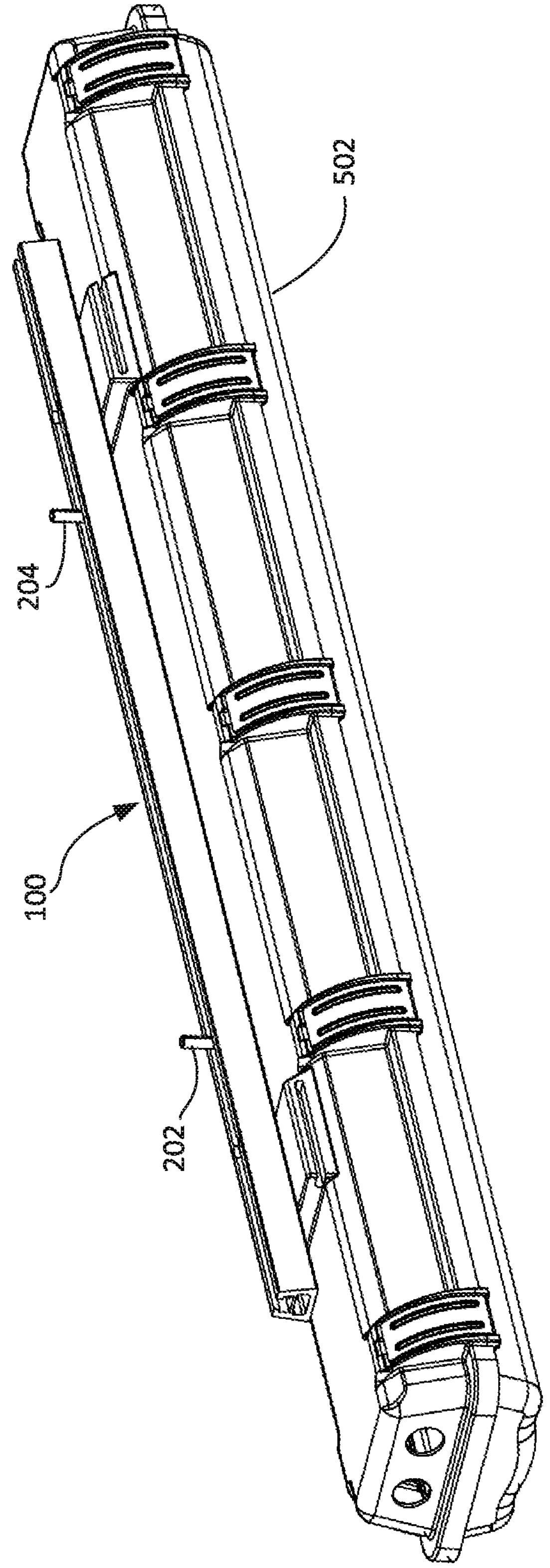
FIG. 5 shows an isometric view of the lighting fixture adapter of FIG. 1 secured to an exemplary lighting device.

FIG. 5 shows the case that the lighting fixture adapter 100 is mounted and fixed in place to an exemplary lighting device 502, wherein, in particular, the lighting fixture adapter 100 may be fixed to a top of the lighting device 502, and a length thereof is depicted as being less than an overall length of the lighting device 502. Of course, it will be clearly understood by those skilled in the art that although such arrangements are shown, the present disclosure is not so limited. For example, it is contemplated that the lighting fixture adapter may also be mounted to other appropriate positions of the lighting device, or the lighting fixture adapter may also have other suitable lengths to facilitate meeting the requirements of different mounting sites or usage situations without departing from the scope of the present disclosure. In this embodiment shown in FIG. 5, the bottom of the lighting fixture adapter 100 may be mounted and fixed to the top of the lighting device 502 (for example, by means of the screws 206, 208 described above, which are not visible in this view), while the top of the lighting fixture adapter 100 may be adjustably fixed to an existing mounting position at site by utilizing the bolts 202, 204. For example, a transverse distance between the bolts 202 and 204 may be adjusted by sliding the bolts 202, 204 within an entire length range of the lighting fixture adapter 100, such that the positions of both of the bolts 202, 204 may correspond to existing mounting positions to further insert and fasten in place the bolts 202, 204 into a mounting structure at site, so as to achieve firm mounting of the lighting and the lighting fixture adapter to the site. By being configured in such way, the lighting fixture adapter 100 according to the present disclosure may have a flexibly adjustable mounting distance to meet a wide variety of mounting requirements, without being limited to the existing position arrangements at site. Therefore, by means of the lighting fixture adapter 100 of the present disclosure, the mounting and replacement of the lighting devices of different specifications may be achieved in a simple way without the need for re-perforation or other structural modifications or adaptations, thereby significantly saving the cost and time for the mounting and replacement of the lighting devices.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A lighting fixture adapter, comprising:

a sliding rail structure configured to slidably receive an insert, the insert being configured to be secured to a mounting position; a mounting slot positioned below the sliding rail structure and configured with one or more mounting holes at a bottom of the mounting slot, the one or more mounting holes being configured to receive one or more mounting features to secure a lighting device to the lighting fixture adapter; and a spacer plate between the sliding rail structure and the mounting slot, the spacer plate having one or more through holes configured to allow the one or more mounting features to pass through, wherein a position of the insert in the sliding rail structure is adjustable within a length range of the sliding rail structure.

2. The lighting fixture adapter of claim 1, wherein when the one or more mounting features are secured to the mounting slot, the one or more mounting features are positioned below the sliding rail structure and allow the insert to slide in the sliding rail structure.

3. The lighting fixture adapter of claim 1, wherein the sliding rail structure has two open ends configured to allow for insertion of the insert into the sliding rail structure in a transverse direction.

4. The lighting fixture adapter of claim 1, and wherein positions of the one or more through holes of the spacer plate correspond to positions of the one or more mounting holes of the mounting slot in a vertical direction.

5. The lighting fixture adapter of claim 1, wherein the sliding rail structure, the mounting slot, and the spacer plate are integrally formed.

6. The lighting fixture adapter of claim 1, wherein the lighting fixture adapter is configured with a cross-sectional shape similar to two stacked trapezoids.

7. The lighting fixture adapter of claim 1, wherein the insert is a bolt.

8. The lighting fixture adapter of claim 1, wherein the mounting feature is a screw.

9. The lighting fixture adapter of claim 1, wherein a length of the lighting fixture adapter is adjustable to fit to different lighting devices.

10. The lighting fixture adapter of claim 1, wherein the sliding rail structure comprises a top opening having one or more notches.

* * * * *